US012775245B2

(12) United States Patent
Balmer

(10) Patent No.: US 12,775,245 B2
(45) Date of Patent: Oct. 27, 2026

(54) SMART WATCH COMPRISING A COMMON-GROUND DEVICE FOR A HOROLOGICAL MOVEMENT

(71) Applicant: ETA SA Manufacture Horlogère Suisse, Grenchen (CH)

(72) Inventor: Raphaël Balmer, Vicques (CH)

(73) Assignee: ETA SA MANUFACTURE HORLOGÈRE SUISSE, Grenchen (CH)

(*) Notice: Subject to any disclaimer, the term of this patent is extended or adjusted under 35 U.S.C. 154(b) by 253 days.

(21) Appl. No.: 18/524,921

(22) Filed: Nov. 30, 2023

(65) Prior Publication Data

US 2024/0201634 A1 Jun. 20, 2024

(30) Foreign Application Priority Data

Dec. 15, 2022 (EP) .................................... 22213672

(51) Int. Cl.
*G04G 17/06* (2006.01)
*G04G 17/04* (2006.01)

(52) U.S. Cl.
CPC ............. *G04G 17/06* (2013.01); *G04G 17/04* (2013.01)

(58) Field of Classification Search
CPC ...... G04G 17/06; G04G 17/04; H01R 13/434; H01R 13/639
USPC ........................................................... 439/294
See application file for complete search history.

(56) References Cited

U.S. PATENT DOCUMENTS

| | | | | |
|---|---|---|---|---|
| 1,653,335 | A | 12/1927 | Bettum | |
| 2,418,999 | A | 4/1947 | Williams | |
| 2003/0167880 | A1 | 9/2003 | Yamakawa | |
| 2014/0086027 | A1* | 3/2014 | Yanagisawa | H01Q 7/00 368/278 |
| 2015/0378321 | A1 | 12/2015 | Fraser et al. | |
| 2017/0192396 | A1 | 7/2017 | Matsuzaki | |

(Continued)

FOREIGN PATENT DOCUMENTS

| | | | |
|---|---|---|---|
| AT | 183376 | B | 10/1955 |
| CN | 217100606 | U | 8/2022 |

(Continued)

OTHER PUBLICATIONS

European Search Report for EP 22 21 3672 dated May 22, 2023.

*Primary Examiner* — Sean Kayes
(74) *Attorney, Agent, or Firm* — Sughrue Mion, PLLC

(57) ABSTRACT

A smart watch (1) including a case (100) having a middle (110), a horological movement (10) housed in the middle (110) and having a processing unit (13) and a communication module (12) electrically connected to electrical conductors (18) in the horological movement (10). The smart watch (1) also includes a common-ground device formed by a conductive resilient ring (200) having an annular body (205) with a central axis (Z), fastening tabs (210) carried by the annular body (205) and cooperating with the middle (110) to form a bayonet locking system (300) by the rotation of the conductive resilient ring (200) relative to the middle (110), about the central axis (Z), between an insertion position and a locked position. The conductive resilient ring (200) includes conductive lugs (250) in electrical contact with the electrical conductors (18) when the conductive resilient ring (200) is in the locked position in the middle (110).

17 Claims, 5 Drawing Sheets

(56) References Cited

U.S. PATENT DOCUMENTS

| | | | | |
|---|---|---|---|---|
| 2018/0287248 | A1* | 10/2018 | Han | H01Q 1/48 |
| 2019/0187619 | A1* | 6/2019 | Wahler | G04B 37/0041 |
| 2019/0379122 | A1* | 12/2019 | Kenkel | H01Q 1/273 |
| 2021/0305677 | A1* | 9/2021 | Matsue | G04G 17/06 |

FOREIGN PATENT DOCUMENTS

| | | | |
|---|---|---|---|
| DE | 1 777 775 | U | 11/1958 |
| EP | 2 533 111 | A1 | 12/2012 |
| WO | 02/095505 | A1 | 11/2002 |

* cited by examiner

SMART WATCH COMPRISING A COMMON-GROUND DEVICE FOR A HOROLOGICAL MOVEMENT

CROSS REFERENCE TO RELATED APPLICATIONS

This application is claiming priority based on European Patent Application No. 22213672.3 filed on Dec. 15, 2022.

TECHNICAL FIELD OF THE INVENTION

The invention relates to a smart watch comprising an electronic or electromechanical horological movement with electrical or electronic members requiring a common ground connection.

TECHNOLOGICAL BACKGROUND

The horological movements of smart watches can have electrical or electronic members that need to be connected to a common potential.

Such electrical members are typically connected to a common potential by means of ground terminals, which can take the form of a tab on a flexible printed circuit connected to the movement.

However, this is not always sufficient, in particular when the horological movement incorporates a communication module, for example a Bluetooth®-type antenna.

Connecting such a communication module to a common potential requires a large number of connectors, which complicates the implementation thereof as a result of the large number of parts, the operation of casing up the movement and the grounding thereof, in particular due to the various manipulations required to place the various connectors. As a result, the productivity of such a solution for connecting to a shared potential is significantly impacted.

Moreover, this operation of connecting to a common potential is typically carried out when the movement is being cased within the case of the smart watch.

The casing of such a horological movement of a smart watch, i.e. the fastening of the movement inside the case, is also often achieved by means of numerous fastening clamps which are inserted into grooves provided along the internal circumference of the case, the assembly being rigidly connected by clamp screws.

As a result, this casing operation as a whole is time-consuming and complex to implement because of the large number of parts (connectors, clamps, screws, etc.), and the various manipulations required to place the connectors, clamps and screws, which significantly impacts the productivity of such a solution for casing and connecting a horological movement of a smart watch to a common potential.

As a result, there is a need to improve the devices for connecting an electronic or electromechanical horological movement of a smart watch to a common potential, in particular to improve the overall casing operation.

SUMMARY OF THE INVENTION

To this end, the invention aims to propose a smart watch comprising an electronic or electromechanical horological movement and a device for connecting electrical members of such a movement to a common ground, overcoming at least one of the aforementioned drawbacks.

According to the invention, such a common-ground device takes the form of a conductive resilient ring allowing various electrical members of an electronic or electromechanical horological movement to be connected quickly. Such a conductive resilient ring according to the invention eliminates the need to use a multitude of connectors.

In this context, the invention relates to a smart watch comprising a case having a middle, a horological movement housed in an internal space delimited by said middle, said horological movement comprising a processing unit and a communication module electrically connected to electrical connectors comprised in the horological movement.

The smart watch further comprises a common-ground device formed by a conductive resilient ring comprising an annular body with a central axis Z, fastening tabs carried by said annular body and cooperating with said middle to form a bayonet locking system by the rotation of the conductive resilient ring relative to the middle, about the central axis Z, between an insertion position and a locked position, and said conductive resilient ring includes conductive lugs configured to be in electrical contact with the electrical conductors of the horological movement when the conductive resilient ring is in the locked position in the middle.

Preferably, the conductive lugs are resilient lugs. Thus, the common-ground device according to the invention also provides a resilient damping solution for the horological movement in the event of an impact to the watch case.

The common-ground device according to the invention further provides a solution for casing the horological movement inside the watch case, eliminating the need for a multitude of retaining clamps and clamp tightening screws, and thus eliminates the numerous manipulations required for the screws and the clamps.

In addition to the features mentioned in the preceding paragraphs, the smart watch according to the invention can have one or more complementary features from among the following, considered either on an individual basis or according to any combination technically possible:

- the electrical conductors are electrical tracks provided on the surface of said horological movement, and the conductive lugs of the conductive resilient ring bear against the electrical tracks when the conductive resilient ring is in the locked position in the middle;
- the conductive lugs are conductive resilient lugs;
- the conductive lugs are configured to exert an axial force parallel to the central axis Z on the horological movement by elastic deformation of the conductive resilient lugs at least when said resilient casing ring is in the locked position in the middle;
- said conductive lugs are configured so that the axial force exerted on the horological movement ensures that said horological movement is held in said middle, preferably in an axial direction parallel to the central axis Z;
- said conductive lugs are configured to form damping means for the horological movement in the event of impacts to the smart watch, preferably in an axial direction parallel to the central axis Z;
- the fastening tabs extend radially relative to the central axis Z;
- each of said conductive lugs comprises a resilient portion connected to the annular body and is shaped to deform elastically;
- said resilient portion comprises a free contact end having at least one portion that is axially offset, along the central axis Z, relative to the annular body, said free contact end being in electrical contact with one of the electrical conductors of the horological movement, when said conductive resilient ring is in the locked position in the middle;

the conductive resilient ring comprises an angular locking member cooperating with a resilient locking finger carried by the horological movement or by the middle, to ensure that said conductive resilient ring is locked against rotation once in the locked position by resilient clipping or locking;

the angular locking member cooperates with an abutment surface of the horological movement or of the middle to form an angular positioning stop for the conductive resilient ring;

the middle has a bearing surface for receiving said fastening tabs of the conductive resilient ring such that they bear thereagainst;

the middle comprises bayonet grooves, said bayonet grooves cooperating with said fastening tabs to form the bayonet locking system;

said conductive resilient ring comprises a positioning coded element for assembling;

said conductive resilient ring comprises at least one recess, the shape whereof is adapted to cooperate with an assembly tool;

said conductive resilient ring comprises a first recess configured to ensure rotation of the conductive resilient ring and a second recess configured to ensure unlocking of said conductive resilient ring, each of the recesses having a shape that is adapted to cooperate with an assembly tool;

the conductive resilient ring is made of a metal or polymer material with a conductive filler.

The invention further relates to an assembly tool for connecting a horological movement of a smart watch to a common ground according to the invention.

The assembly tool comprises at least one protruding element configured to cooperate with at least one recess in the conductive resilient ring.

Preferably, the assembly tool comprises protruding elements configured to cooperate with a plurality of recesses in said conductive resilient ring, said protruding elements rotating said conductive resilient ring when said assembly tool is rotated by an operator, a controller or a robot.

Advantageously, the assembly tool comprises an unlocking pin configured to disengage said resilient locking finger when said assembly tool is in position on the conductive resilient ring so as to allow it to be unlocked from said horological movement.

The invention further relates to a method for connecting an electronic or electromechanical horological movement of a smart watch to a common ground according to the invention.

The method for connection to a common ground according to the invention comprises:

a step of inserting said horological movement into the middle of the case;

a step of inserting the common-ground device, formed by said conductive resilient ring, over the horological movement;

a step of connecting the electrical connectors of the horological movement to a common ground, during which step the conductive resilient ring is rotatably engaged about the central axis Z until it reaches a locked position, the rotation engaging said fastening tabs in a plurality of bayonet grooves in the middle, said conductive lugs coming into electrical contact with the electrical conductors of the horological movement when the conductive resilient ring is in the locked position.

Preferably, during the step of inserting the common-ground device formed by said conductive resilient ring, the fastening tabs of said conductive resilient ring come to bear against a bearing surface of said middle.

Preferably, the step of connection to a common ground allows the horological movement to be cased within said watch case and held in said watch case.

Preferably, the step of connecting the electrical connectors of the horological movement to a common ground is carried out using an assembly tool comprising at least one protruding element cooperating with at least one recess in said conductive resilient ring to rotatably engage the conductive resilient ring when the assembly tool is rotated by an operator, a controller or a robot.

The method for connection to a common ground can be manual, i.e. carried out by an individual, or automated.

BRIEF DESCRIPTION OF THE FIGURES

The purposes, advantages and features of the present invention will be better understood upon reading the detailed description given below with reference to the following figures:

FIG. 2 illustrating in particular the common-ground device in its insertion position;

FIG. 3 illustrating in particular the common-ground device in its locked position inside the middle;

In all the figures, common elements bear the same reference numerals unless specified to the contrary.

DETAILED DESCRIPTION OF THE INVENTION

Figure 1:
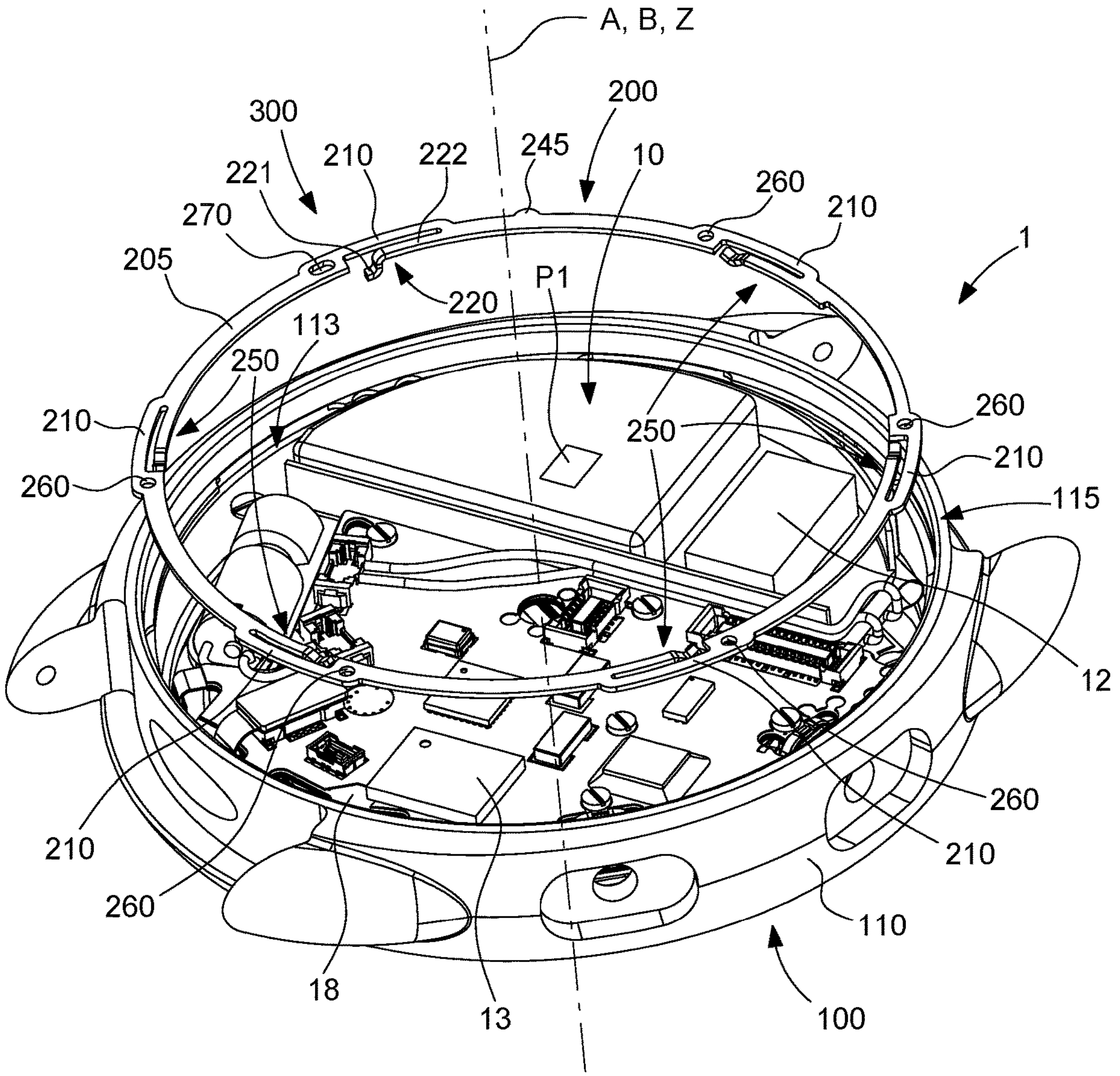
FIG. 1 is a semi-exploded, perspective view of a smart watch according to the invention comprising a case with a middle, a horological movement mounted in the middle and a common-ground device for grounding the horological movement.

FIG. 1 is an exploded, perspective view of a smart watch 1 according to the invention comprising a case 100 having a central axis B and a middle 110 configured to be closed on either side by a case back (not shown) and by a crystal (not shown).

The smart watch 1 comprises a horological movement 10 housed in the internal space 115 delimited by the middle 110.

For example, the middle 110 is made of a metal, ceramic or polymer material, or of a combination of different materials.

The horological movement 10 can be an electromechanical or electronic movement.

The horological movement 10 has a central axis A perpendicular to a general plane P1. The general plane P1 of the horological movement 10 is parallel to the plane of the hands (not shown). The central axis A of the horological movement 10 is parallel or corresponds to the axis of rotation of the hands of the movement.

The central axis A of the horological movement 10 is parallel to or corresponds to the central axis B of the middle 110.

Preferably, the horological movement 10 comprises a time module, a processing unit 13 and a communication module 12, for example a Bluetooth®-type antenna.

Such a communication module 12 requires one of its potentials to be fixed. One of the potentials of the communication module 12 must thus be conductively coupled to a common-ground device.

It goes without saying that other electrical or electronic members comprised in the horological movement 10 may also require a common ground.

The processing unit 13 and the communication module 12 have a potential electrically connected to at least one electrical connector 18 comprised in the horological movement 10.

Preferably, the horological movement 10 comprises a plurality of electrical connectors 18 provided on the surface of the horological movement 10.

Preferably, the electrical connectors 18 are distributed around the periphery of the horological movement 10, i.e. in a region radially distant from the central axis A.

In the example embodiment shown, the connection of the horological movement 10 to a common ground (or common potential) is carried out from the case back side. It goes without saying that a connection of the horological movement 10 to a common ground can also be carried out from the crystal side while still remaining within the scope of the invention.

The main objective of the invention is to propose a common-ground device to facilitate this operation of connecting the various electrical or electronic members of the horological movement 10 to a common ground when the horological movement 10 is assembled in the case 100.

The common-ground device according to the invention also simplifies the fastening of the horological movement 10 to the middle 110 during the casing operation, in particular by eliminating the need to use a plurality of clamps and screws.

The common-ground device according to the invention advantageously comprises means for fastening, securing and locking the horological movement 10 in the case 100. The common-ground device can thus also replace a device for casing a horological movement.

Thus, thanks to such a common-ground device according to the invention, the step of connecting the horological movement 10 to a common ground and the step of fastening the horological movement 10 in the middle 110 are carried out simultaneously in a single locking operation of the common-ground device.

According to the invention, the common-ground device is a conductive resilient ring 200.

Figure 2:
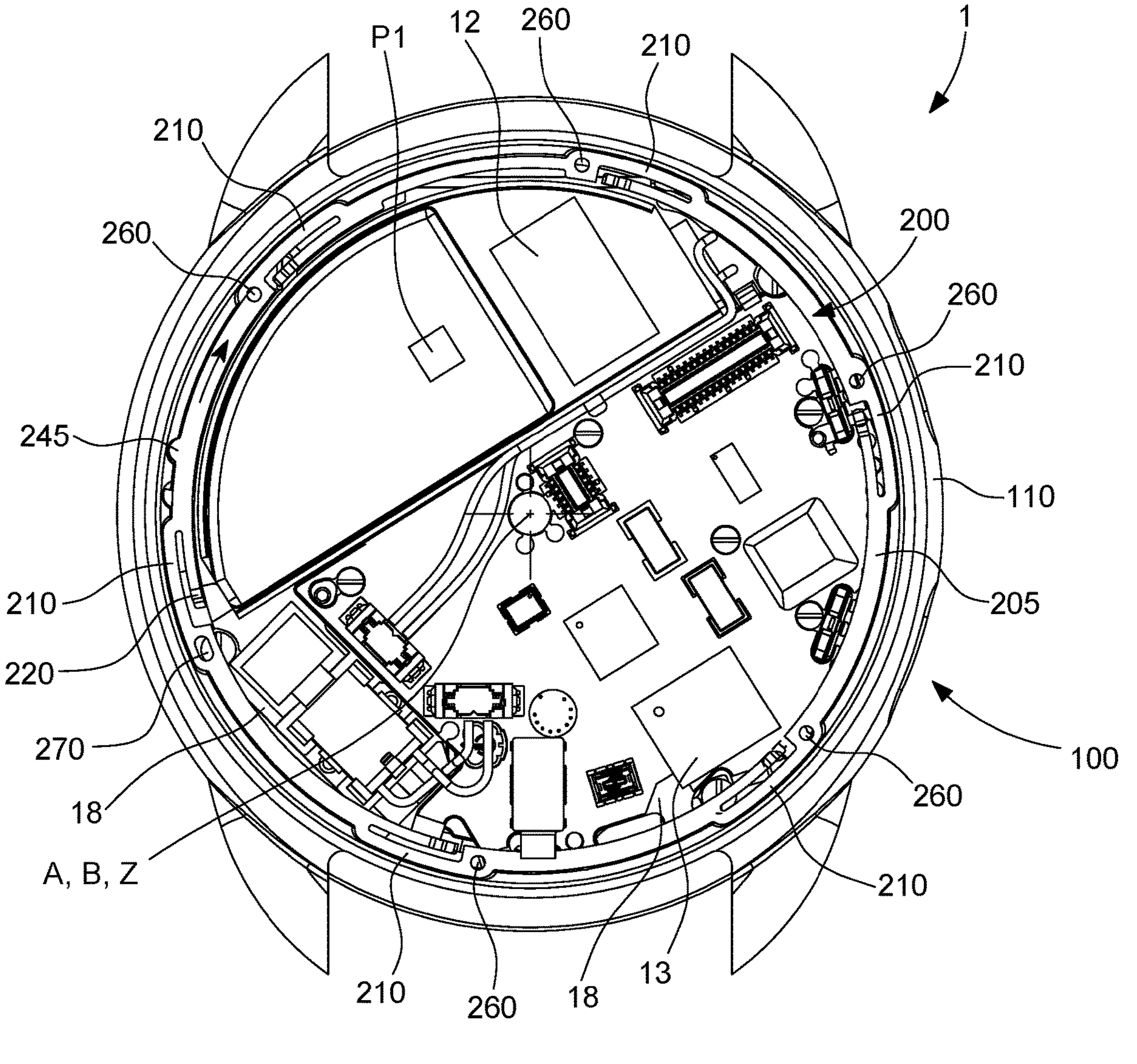
FIG. 2 is a top view of the smart watch according to the invention illustrated in FIG. 1.
Figure 3:
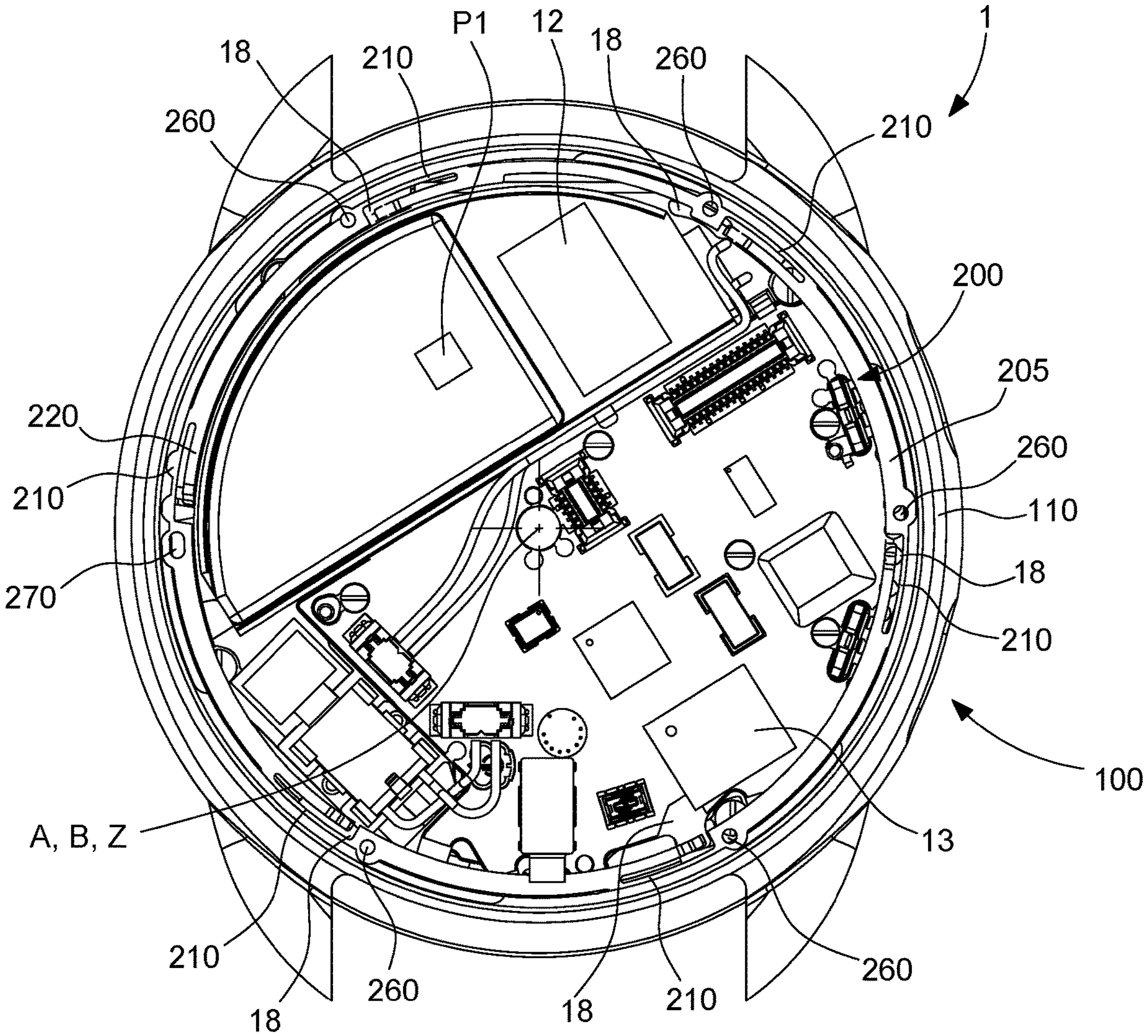
FIG. 3 is a top view of the smart watch according to the invention illustrated in FIG. 1.

FIG. 2 illustrates more particularly a top view of such a smart watch 1 according to the invention, inside which the horological movement 10 is assembled in the case 100 and the conductive resilient ring 200 is positioned above the horological movement 10 in an insertion position (i.e. not locked). From this insertion position of the conductive resilient ring 200, a rotation of the conductive resilient ring 200 by a few degrees about the axis Z brings the conductive resilient ring into a locked position as shown in FIG. 3. This locked position ensures that the electrical members of the horological movement, and in particular the communication module 12, are connected to a common ground.

By way of example, the locking direction is shown to be clockwise by an arrow on the conductive resilient ring 200 illustrated in FIG. 2. However, the locking direction can also be counter-clockwise.

FIG. 3 illustrates in particular the conductive resilient ring 200 in the locked position and electrically connected to the various electrical connectors 18 of the horological movement 10.

Advantageously, such a conductive resilient ring 200 is made of a metal or polymer material comprising a conductive filler.

Such a conductive resilient ring 200 also has a damping function to attenuate the effects of movements of the horological movement 10, and mainly the effects of axial movements along the axis Z in the event of impacts to the watch case 100. The conductive resilient ring 200 comprises an annular body 205 having a central axis Z and fastening tabs 210 extending in a radial direction, relative to the axial direction Z.

In the example embodiment shown, the central axis A of the horological movement 10 coincides with the central axis Z of the annular body 205 of the conductive resilient ring 200. However, other configurations are also possible while still remaining within the scope of the invention.

The fastening tabs 210 of the conductive resilient ring 200 cooperate with bayonet grooves 113 made in the middle 110 to form a bayonet casing system 300. Such a bayonet locking system 300 allows the horological movement 10 to be connected to a common ground, and optionally to be cased, simply by rotating the conductive resilient ring 200 relative to the middle 110 about the axis Z between an insertion position (not locked), illustrated in FIG. 2, in which no connection to a common ground is made, and a locked position, illustrated in FIG. 3, in which the horological movement, and in particular the communication module 12, is connected to a common ground.

Figure 4:
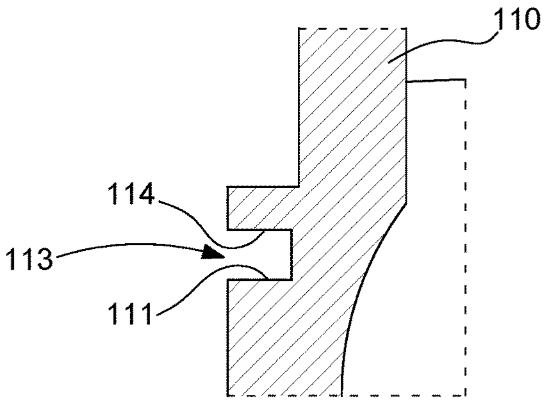
FIG. 4 shows a cross-sectional view of the middle according to the invention, which cross-section is made at a bayonet groove.

FIG. 4 illustrates a cross-sectional view of the middle 110, more particularly showing a portion having a bayonet groove 113.

To receive the conductive resilient ring 200, the middle 110 comprises a bearing surface 111 forming a circular shoulder extending along the inner periphery of the middle 110.

More specifically, when the conductive resilient ring 200 is inserted into the middle 110, the fastening tabs 210 come to rest at least partially on the bearing surface 111 of the middle 110.

Generally speaking, the terms “internal”, “inner”, “external” and “outer” are of course to be understood relative to the axial direction Z illustrated in FIG. 1, which forms the central axis of the conductive resilient ring 200; an “internal” element being closer to the central axis than an “external” element.

According to one alternative embodiment, a plurality of bearing surfaces 111 can be arranged and extend over angular portions of the inner periphery of the middle 110 and be distributed evenly, or otherwise, along the inner periphery of the middle 110. In this alternative embodiment, the number of bearing surfaces 111 would preferably be equal to the number of fastening tabs 210 of the resilient casing ring 200.

In the example embodiment shown, the conductive resilient ring 200 comprises six fastening tabs 210. However, the number of fastening tabs 210 is not limited to six, and this number could be equal to two or an arbitrary number greater than two. The bayonet grooves 113 are formed between the bearing surface 111 and a retaining surface 114 facing the bearing surface 111.

The number of bayonet grooves 113 is at least equal to the number of fastening tabs 210.

In the example embodiment illustrated, the bayonet grooves 113 are arranged in a plane parallel to the general plane P1 of the horological movement 10, i.e. in a plane perpendicular to the central axis A of the horological movement 10.

In an alternative embodiment, the bayonet grooves 113 can be arranged to include at least one portion that is inclined relative to the general plane P1 of the horological movement 10, so as to guide the rotation and translation of the fastening tabs 210, and thus impose a vertical displacement of the conductive resilient ring 200, along the axis Z and towards the horological movement 10, when locking by rotation about the axis Z. For example, the bayonet grooves 113 can have at least one portion with a gradient that is directed towards the crystal of the case 100 (i.e. towards the side opposite that via which the horological movement 10 and the resilient casing ring 200 are inserted).

The space between the bearing surface 111 and the retaining surface 114 defines the width of the bayonet groove 113. It goes without saying that the width of the bayonet grooves 113 can be constant or variable, for example with a width at its widest at an insertion end portion to facilitate insertion of the fastening tabs 210, and a width at its narrowest at the bottom of the bayonet grooves 113, for example with a width close to, or corresponding to, the thickness of the fastening tabs 210 to further retain the fastening tabs 210 by rubbing or friction.

However, as will be seen later, such an arrangement is not essential because the conductive resilient ring 200 according to the invention comprises a plurality of conductive resilient lugs 250 in contact with the horological movement 10 acting elastically on the horological movement 10. In this way, the conductive resilient lugs 250 will, by resilient counter-reaction, work to hold the fastening tabs 210 of the conductive resilient ring 200 pressed against the retaining surface 114 at the bayonet grooves 113.

The bayonet grooves 113 can comprise a bottom, or an obstacle, for example a protuberance, to form an angular positioning stop for when the conductive resilient ring 200 is rotating.

The conductive resilient ring 200 further comprises at least one positioning coded element for assembling (assembly key) 245 cooperating with a cavity 246 formed in the middle 110 and extending axially along the axis Z.

The conductive resilient ring 200 comprises an angular locking member 220 which prevents the locking position of the conductive resilient ring 200 from rotating. The angular locking member 220 is configured to prevent the conductive resilient ring 200 from accidentally loosening or unlocking, in particular in the event of impacts to the case 100. Thus, such an angular locking member 220 ensures that the connection of the horological movement 10 to a common ground is guaranteed even in the event of an impact to the smart watch 1.

According to one alternative embodiment, the conductive resilient ring 200 comprises a plurality of angular locking members 220.

Figure 5:
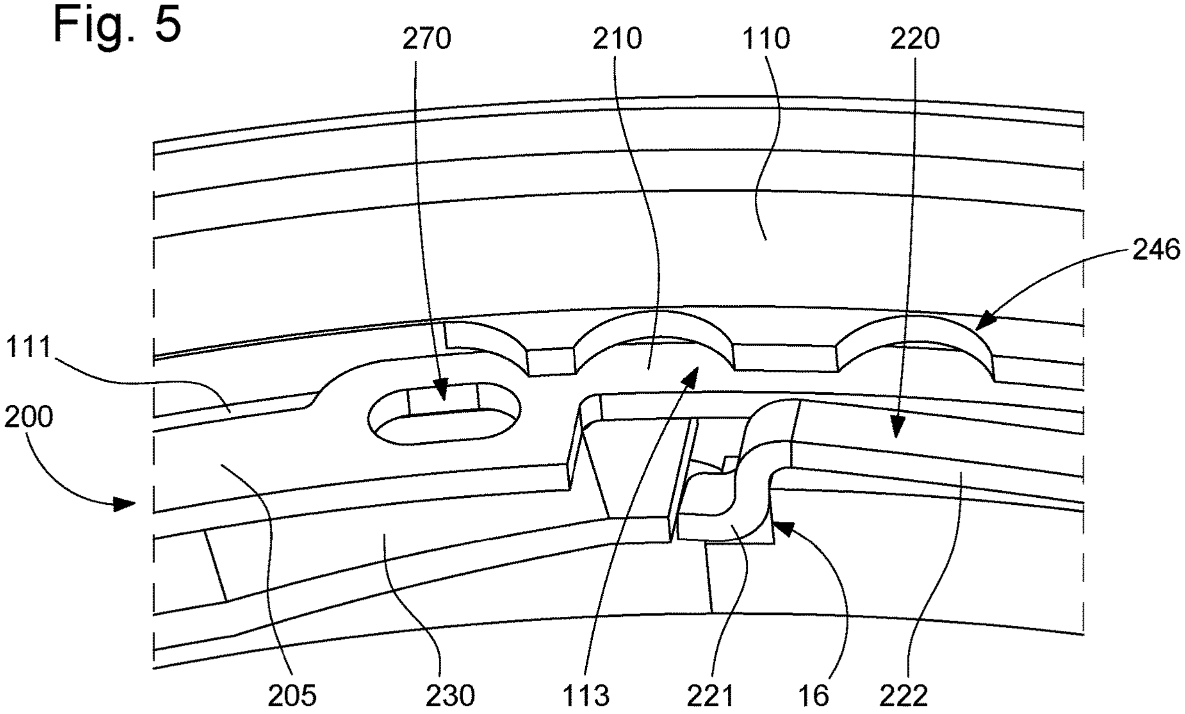
FIG. 5 is a detail view of the common-ground device according to the invention, illustrating more particularly an angular locking member of the common-ground device.

FIG. 5 illustrates a portion of the conductive resilient ring 200 comprising an angular locking member 220.

In a first alternative embodiment, as illustrated, the angular locking member 220 has a portion 222 connected to the annular body 205 of the conductive resilient ring 200 at a first end. The portion 222 has a free end 221, opposite the first end, which is axially offset along the axis Z relative to the annular body 205. The free end 221 thus protrudes from the annular body 205 of the conductive resilient ring 200, and is directed towards the horological movement 10.

The angular locking member 220 is configured to cooperate with a resilient locking finger 230 provided on the middle 110 or on the horological movement 10. Such a resilient locking finger 230 is shaped to prevent the conductive resilient ring 200 from counter-rotating when the latter is in abutment. The ring is thus in the locked position.

In a second alternative embodiment, the angular locking member 220 can take the form of an asperity, for example a hole, provided at least in the lower surface of the annular body 205 (i.e. in the surface intended to face the horological movement 10). The asperity may or may not be through-going. The resilient locking finger 230 provided on the middle 110 or on the horological movement 10, is thus shaped to fit at least partially into the asperity so as to prevent the conductive resilient ring 200 from counter-rotating when coming into abutment. The ring is thus in the locked position.

In the example embodiment illustrated, the resilient locking finger 230 belongs to the horological movement 10, the horological movement 10 being locked against rotation in the middle 110 by catches, bars or ad hoc means cooperating with slots formed in the inner periphery of the middle 110. These means also allow a positioning coded element for assembling (assembly key) to be formed in order to guarantee the correct positioning and orientation of the horological movement 10 in the middle 110 when assembling the horological movement 10 inside the case 100.

As illustrated in FIG. 5, the angular locking member 220 of the conductive resilient ring 200 can also form an angular positioning stop for the conductive resilient ring 200 by coming into contact with an abutment surface 16 of the middle 110 or of the horological movement 10, which eliminates the need to produce one or more angular stops in the grooves 113 in the middle 110. The manufacture of such a middle 110 is thus simplified.

The angular locking member 220 and the resilient locking finger 230 form blocking means by the resilient clipping or locking of the conductive resilient ring 200. The rotation-prevention means are reversible and can be unlocked by means of a point or an assembly/disassembly tool allowing the resilient locking finger 230 to be stressed and deformed elastically, in this case in an axial direction parallel to the axis Z, in order to release the angular locking member 220 and the rotation of the conductive resilient ring 200, in a direction for unlocking and disassembling the conductive resilient ring 200.

The resilient locking finger 230 functions as a disengageable element. It is configured so as to be inactive when the conductive resilient ring 200 is being assembled and to prevent the ring from counter-rotating once it is in the locked position (operating position of the smart watch 1).

More particularly, in the alternative embodiment illustrated, the resilient locking finger 230 is shaped so that, when it is in the free position, its end is positioned axially above the portion of the free end 221 of the angular locking member 220 located axially the furthest from the annular body 205.

The resilient locking finger 230 can be made of either a polymer or metal material.

The conductive resilient ring 200 has conductive lugs configured to bear against the electrical connectors 18 of the horological movement 10. For example, the electrical connectors 18 are electrical tracks provided on the surface of the horological movement 10.

Optionally, the conductive lugs 250 can be shaped to exert a sufficient axial force on the horological movement 10, along an axis parallel to the axis Z of the horological movement 10, to ensure that it is held in the middle 110 without having to resort to other ad hoc devices to carry out the casing operation, such as clamps and screws, for example, or even a casing ring.

Advantageously, the conductive lugs 250 are conductive resilient lugs.

Such conductive resilient lugs 250 allow the horological movement 10 to be axially stressed in the middle 110 to hold it in position inside the middle 110 during normal use, while forming means for absorbing the movements, in particular the axial movements, of the horological movement 10 in the event of impacts to the case 100.

Figure 6:
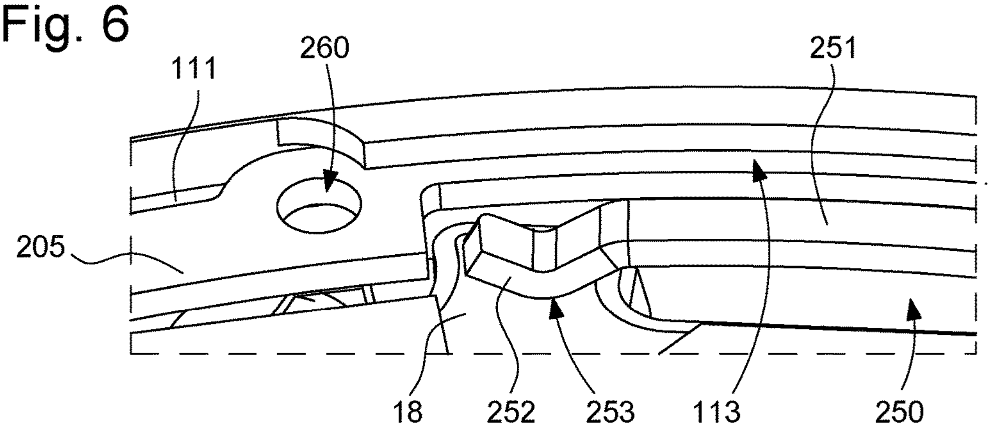
FIG. 6 is a detail view of the common-ground device according to the invention, illustrating more particularly a resilient electrical contact lug.

FIG. 6 illustrates in particular a portion of the resilient casing ring 200 at one of the conductive resilient lugs 250.

The conductive resilient lugs 250 comprise a resilient portion 251 connected to the annular body 205 of the conductive resilient ring 200 at a first end. This resilient portion 251, which for example takes the form of a blade, is intended to deform elastically relative to the annular body 205 of the resilient casing ring 200. The resilient portion 251 comprises a free contact end 252, at least one portion 253 whereof is axially offset relative to the annular body 205 of the resilient casing ring 200 and to the fastening tabs 210, along the axis Z. The free contact end 252 thus protrudes from the annular body 205 of the resilient casing ring 200 towards the horological movement 10.

Advantageously, the free contact ends 252 of the conductive resilient lugs 250 and the free end 221 of the angular locking member 220 are provided at different heights relative to the plane formed by the annular body 205.

The free contact ends 252 of the conductive resilient lugs 250 are configured to come into contact on the various electrical connectors 18 of the horological movement 10 when the conductive resilient ring 200 is in the locked position inside the middle 110.

Preferably, the conductive resilient lugs 250 are configured to exert sufficient force to ensure electrical contact and connection of the horological movement 10 to a common ground, even in the event of impacts to the case 100.

Preferably, the free contact ends 252 of the conductive resilient lugs 250 are configured to exert an axial force parallel to the central axis Z on the horological movement 10 when the conductive resilient ring 200 is in the locked position inside the middle 110.

All of the electrical connectors 18 are brought into electrical contact via the conductive resilient ring 200 by rotating the ring 200, the rotation bringing and positioning the various conductive resilient lugs 250 into electrical contact with the electrical connectors 18. The horological movement 10 is thus connected to a common ground when the resilient casing ring 200 is locked, via a single rotational operation.

Preferably, the conductive resilient lugs 250 are configured to stress the horological movement 10 in the middle 110 to hold it in position inside the middle 110 during normal use, while forming absorption or damping means attenuating the displacements of the horological movement 10 in the event of an impact to the watch case 100.

In the example embodiment illustrated, the conductive resilient lugs 250 axially stress the horological movement 10 along the axis Z in order to attenuate the effects of the axial displacements of the horological movement 10 along this axis.

The electrical connectors 18 can be recessed within an upper surface of the horological movement 10, configured to receive and house the conductive resilient lugs 250. The recessed electrical connectors 18 can thus give an indication of the position of the conductive resilient ring 200 and/or contribute to locking the conductive resilient ring 200 in the locked position.

The conductive resilient lugs 250 housed in these recessed electrical connectors 18 can also prevent, at least in part, the horological movement 10 from being displaced in the plane P1 and/or damp or attenuate the displacements of the horological movement 10 in the plane P1.

The conductive resilient ring 200 further comprises a recess 260, preferably at least two, configured to cooperate with protruding elements 460 such as protuberances, pins or catches, of an assembly tool 400 for assembling (locking) and disassembling (unlocking) the conductive resilient ring 200.

In the example embodiment shown, the resilient ring comprises five recesses 260.

The recesses 260 can be holes, notches, etc. They can have identical or different shapes.

The assembly tool 400 comprises a body 410 to facilitate the handling, locking and unlocking of the conductive resilient ring 200.

Figure 7:
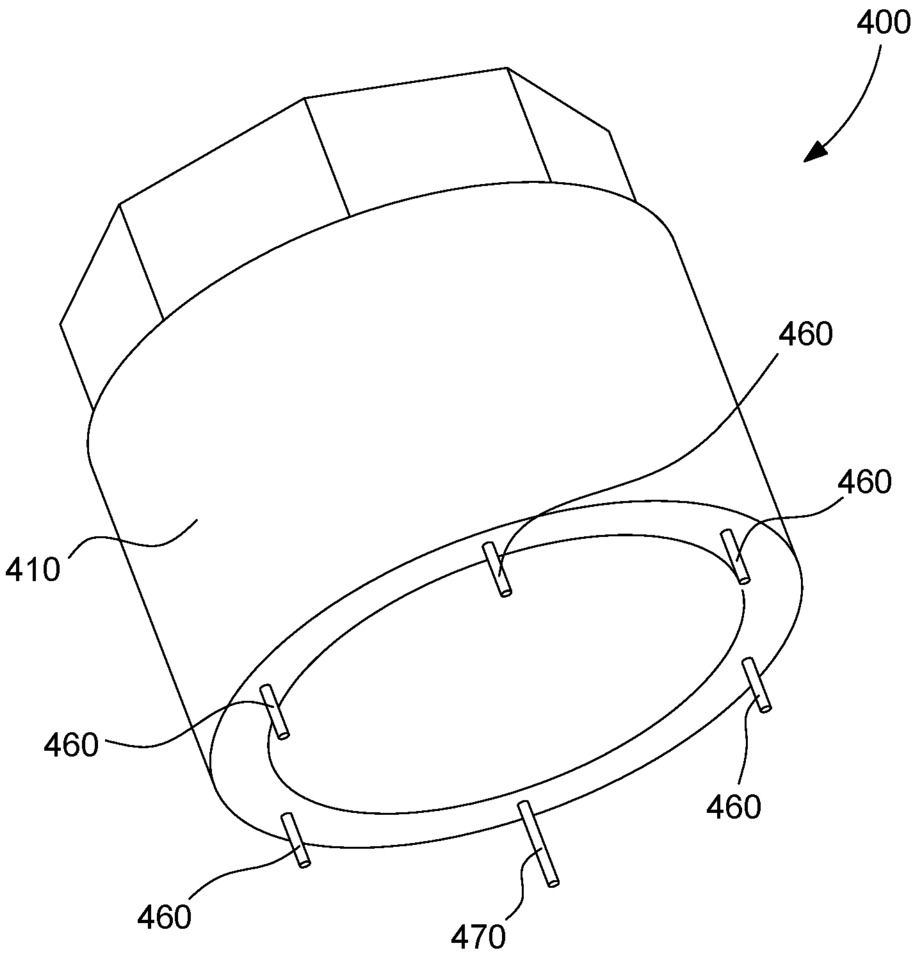
FIG. 7 is a diagrammatic view of an assembly/disassembly tool for connecting a horological movement to a common ground by means of the common-ground device according to the invention.

FIG. 7 diagrammatically illustrates such an assembly tool 400 according to the invention for assembling the conductive resilient ring, connecting the horological movement 10 to a common potential, and optionally casing the horological movement 10 into the middle 110.

The assembly tool 400 can take the form of a sleeve that is easily gripped by a watchmaker and has at least one pin 460 configured to fit into said at least one recess 260 in the conductive resilient ring 200.

In the example embodiment shown, the assembly tool 400 comprises five pins 460 configured to fit into the five recesses 260 in the conductive resilient ring 200.

The conductive resilient ring 200 further comprises a disassembly recess 270 configured to receive and allow an unlocking pin 470 of the assembly tool 400 to pass. Such a disassembly recess 270 preferably has a specific shape that differs from that of the other recesses 260, in particular to make it easier to identify compared to the other recesses. It goes without saying that other means can be used to easily identify the disassembly recess 270 compared to the other recesses 260 used to rotate the conductive resilient ring 200.

The disassembly recess 270 is, for example, an oblong hole or notch, whereas the recesses 260 can be circular in shape.

The disassembly recess 270 is formed in the annular body 205 so as to be positioned above the resilient locking finger 230 when the conductive resilient ring 200 is in the locked position in the middle 110.

The unlocking pin 470 of the assembly tool 400 is configured to disengage the resilient locking finger 230 when the assembly tool 400 is positioned on the conductive resilient ring. The unlocking pin 470 is configured to press and elastically deform the resilient locking finger 230 so as to release it from the angular locking member 220 or remove it from the trajectory of the angular locking member 220, thus allowing the conductive resilient ring 200 to counter-rotate.

Thus, once the assembly tool 400 is in position on the conductive resilient ring 200, it is easy to disassemble the conductive resilient ring 200 simply by rotating the tool in the opposite direction to the direction of assembly, which causes the conductive resilient ring 200 to rotate as a result of the cooperation of the pins 460 and the recesses 260.

Advantageously, in the insertion position of the conductive resilient ring 200, i.e. in the position in which the resilient casing ring 200 is just resting on the bearing surface 111 of the middle 110 (the fastening tabs 210 not being engaged in the bayonet grooves 113), the conductive resilient lugs 250 are not in electrical contact with the electrical connectors 18 of the horological movement. The conductive resilient lugs 250 are thus in contact with the electrical connectors 18 only when the conductive resilient ring 200 is locked in the middle 110.

However, the conductive resilient lugs 250 can be in contact with other non-conductive parts of the horological movement 10 in the insertion position.

Advantageously, the conductive resilient lugs 250 exert a force, in particular an axial force, on the horological movement 10 only when the resilient casing ring 200 is in the locked position.

Method for Connecting a Horological Movement of a Smart Watch to a Common Ground According to the Invention To connect the horological movement 10 to a common ground, a first operation consists of inserting the horological movement 10 into the middle 110 so that the various indexing elements of the movement 10 and of the middle 110, where present, line up. The horological movement 10 can thus be installed in a predefined angular position relative to the middle 110. The various indexing elements hold the horological movement 10 in rotation in the middle 110, relative to the axis Z.

In the example embodiment shown, the horological movement 10 is inserted from the case back side.

A second operation then consists of inserting the conductive resilient ring 200 above the horological movement 10 until the fastening tabs 210 come to bear against the bearing surface 111 of the middle 110.

According to one alternative embodiment, the conductive resilient ring 200 can be deposited directly onto the horological movement 10.

A third operation consists in rotating the conductive resilient ring 200 in a determined locking direction, for example in the clockwise direction, so that the fastening tabs 210 are inserted into the bayonet grooves 113, until they reach a stop position thanks to the one or more angular positioning stops. The conductive resilient ring 200 is thus in the locked position.

In the example embodiment described hereinabove, the angular locking member 220 of the conductive resilient ring 200 cooperates with an abutment surface of the horological movement 10 to form an angular positioning stop for the resilient casing ring 200. In the example embodiment described hereinabove, the angular locking member 220 of the conductive resilient ring 200 cooperates with the abutment surface 16 of the horological movement 10 to form the angular positioning stop for the conductive resilient ring 200.

During rotation, the operator may have to overcome a resisting force due to the elastic deformation of one or more conductive resilient lugs 250 engaging on the surface of the horological movement 10.

For example, during rotation, the operator may have to overcome a resisting force due to the elastic deformation of one or more conductive resilient lugs 250 coming into contact with the horological movement 10 during rotation of the ring 200, and/or overcome the resisting force caused by the friction of the one or more conductive resilient lugs 250 in contact with the horological movement 10.

The operator may also need to apply an axial force along the axis Z to the conductive resilient ring 200 so as to elastically stress the conductive resilient lugs 250 so as to be able to engage the fastening tabs 210 in the grooves 113.

Preferably, the conductive resilient ring 200 is rotated using the assembly tool 400 according to the invention described hereinabove. Such a casing tool 400 facilitates the handling of such a conductive resilient ring 200 according to the invention.

To this end, the method can comprise a prior step consisting of positioning the assembly tool 400 on the conductive resilient ring 200 by lining up the various pins 460, 470 of the assembly tool 400 with the various respective recesses 260, 270 in the conductive resilient ring 200.

During rotation of the conductive resilient ring, the free end 221 of the angular locking member 220 comes into contact with the resilient locking finger 230, gradually deforming it elastically as the ring 200 rotates or as soon as the conductive resilient ring 200 is positioned above the horological movement 10. When the conductive resilient ring 200 reaches its final angular position (abutted position), the resilient locking finger 230 is no longer stressed, and can return to its free rest position, so as to cooperate with the angular locking member 220, thus preventing the conductive resilient ring 200 from counter-rotating. The conductive resilient ring 200 is thus locked in position.

In the example embodiment shown, the resilient locking finger 230 is positioned axially (along the axis Z) facing or above the angular locking member 220, thus preventing counter-rotation of the conductive resilient ring 200.

The angular locking member 220, in cooperation with the resilient finger 230 of the horological movement 10, allows the ring to be locked in the locked position and prevents any unexpected and involuntary disassembly or loosening of the conductive resilient ring 200, for example under the effect of vibrations, successive expansion cycles, impacts, inadvertent use by the wearer, or the like.

The conductive resilient ring 200 moves from the insertion position to the locked position, and vice-versa, by rotating by about 20°.

Once in the locked position, the various conductive resilient lugs 250 are in electrical contact with the various electrical connectors 18 of the horological movement 10.

Advantageously, rotational locking of the conductive resilient ring also ensures that the horological movement 10 is held in the middle 110.

Disassembly of the conductive resilient ring preferably requires the use of an assembly tool 400 to disengage the resilient finger 230 and release the angular locking member 220 so that it can rotate in the unlocking direction.

Preferably, the tool mentioned during assembly of the conductive resilient ring 200 is also used for unlocking and disassembling the conductive resilient ring 200. As described hereinabove, the tool 400 comprises an unlocking pin 470 configured to cooperate with the resilient locking finger 230 and to stress it in an axial position relative to the axis Z, when the tool is held in position on the conductive resilient ring 200 by the operator.

Preferably, the method for connecting the horological movement 10 to a common ground according to the invention allows the horological movement 10 to be cased within the middle 110.

Generally speaking, the invention has been described with operations carried out by an operator. However, the invention can also be applied to a controller or a robot, such that the method for connecting a horological movement to a common ground according to the invention can be manual or automated.

The invention claimed is:

1. A smart watch comprising:

a case having a middle;

a horological movement housed in an internal space delimited by said middle, said horological movement comprising a processing unit and a communication module electrically connected to electrical conductors comprised in the horological movement; and a common-ground device formed by a conductive resilient ring comprising an annular body with a central axis, fastening tabs carried by said annular body and cooperating with said middle to form a bayonet locking system by the rotation of the conductive resilient ring relative to the middle, about the central axis, between an insertion position and a locked position, wherein said conductive resilient ring includes conductive lugs that come into electrical contact with the electrical conductors of the horological movement when the conductive resilient ring is in the locked position in the middle, and wherein the electrical conductors are electrical tracks provided on a surface of said horological movement, and the conductive lugs of the conductive resilient ring bear against the electrical tracks when the conductive resilient ring is in the locked position in the middle.

2. The smart watch according to claim 1, wherein the conductive lugs are conductive resilient lugs.

3. The smart watch according to claim 2, wherein the conductive lugs are configured to exert an axial force parallel to the central axis on the horological movement by elastic deformation of the conductive lugs at least when said resilient casing ring is in the locked position in the middle.

4. The smart watch according to claim 3, wherein said conductive lugs are configured so that the axial force exerted on the horological movement ensures that said horological movement is held in said middle.

5. The smart watch according to claim 2, wherein said conductive lugs are configured to attenuate movements of the horological movement in the event of impacts to the smart watch.

6. The smart watch according to claim 1, wherein the fastening tabs extend radially relative to the central axis.

7. The smart watch according to claim 1, wherein each of said conductive lugs comprises a resilient portion connected to the annular body and shaped to deform elastically.

8. The smart watch according to claim 1, wherein the conductive resilient ring comprises an angular locking member cooperating with a resilient locking finger carried by the horological movement or by the middle, to ensure that said conductive resilient ring is locked against rotation once in the locked position by resilient clipping.

9. The smart watch according to claim 8, wherein the angular locking member cooperates with an abutment surface of the horological movement or of the middle to form an angular positioning stop for the conductive resilient ring.

10. The smart watch according to claim 1, wherein the middle has a bearing surface for receiving said fastening tabs of the conductive resilient ring such that they bear thereagainst.

11. The smart watch according to claim 1, wherein the middle comprises bayonet grooves, said bayonet grooves cooperating with said fastening tabs to form the bayonet locking system.

12. The smart watch according to claim 1, wherein said conductive resilient ring comprises a positioning coded element for assembling.

13. The smart watch according to claim 1, wherein said conductive resilient ring comprises at least one recess adapted to cooperate with an assembly tool.

14. The smart watch according to claim 1, wherein said conductive resilient ring comprises a first recess configured to ensure rotation of the conductive resilient ring and a second recess configured to ensure unlocking of said conductive resilient ring, each of the recesses being is adapted to cooperate with an assembly tool.

15. The smart watch according to claim 1, wherein the conductive resilient ring is made of a metal or polymer material with a conductive filler.

16. A method for connecting an electronic or electromechanical horological movement of a smart watch to a common ground according to claim 1, comprising:

a step of inserting said horological movement into the middle of the case;

a step of inserting the common-ground device, formed by said conductive resilient ring, over the horological movement; and a step of connecting the electrical conductors of the horological movement to a common ground, during which step the conductive resilient ring is rotatably engaged about the central axis until it reaches a locked position, the rotation engaging said fastening tabs in a plurality of bayonet grooves in the middle, said conductive lugs coming into electrical contact with the electrical conductors of the horological movement when the conductive resilient ring is in the locked position.

17. A smart watch comprising a case having a middle;

a horological movement housed in an internal space delimited by said middle, said horological movement comprising a processing unit and a communication module electrically connected to electrical conductors comprised in the horological movement; and a common-ground device formed by a conductive resilient ring comprising an annular body with a central axis, fastening tabs carried by said annular body and cooperating with said middle to form a bayonet locking system by the rotation of the conductive resilient ring relative to the middle, about the central axis, between an insertion position and a locked position, wherein said conductive resilient ring includes conductive lugs that come into electrical contact with the electrical conductors of the horological movement when the conductive resilient ring is in the locked position in the middle, wherein each of said conductive lugs comprises a resilient portion connected to the annular body and shaped to deform elastically, and wherein said resilient portion comprises a free contact end having at least one portion that is axially offset, along the central axis, relative to the annular body, said free contact end being in electrical contact with one of the electrical conductors of the horological movement, when said conductive resilient ring is in the locked position in the middle.

* * * * *